June 28, 1949.  W. H. CARLING  2,474,466
MEASURING INSTRUMENT.
Filed Dec. 31, 1947
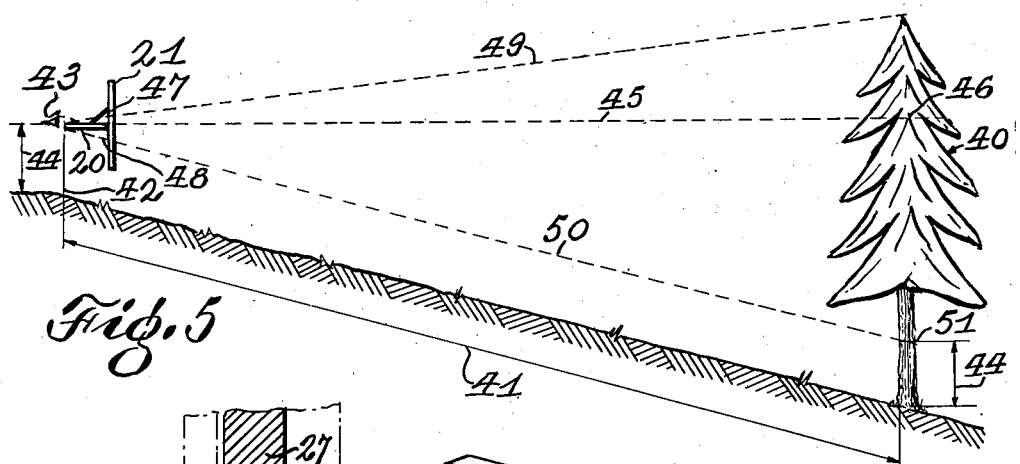
Fig. 5
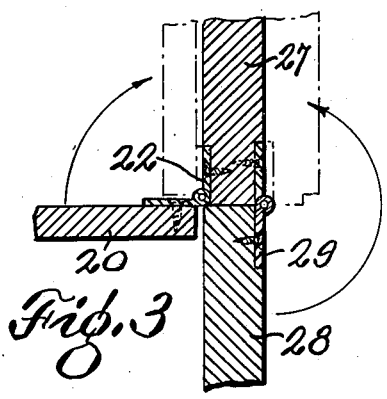
Fig. 3
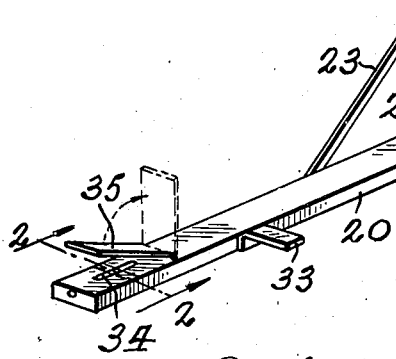
Fig. 1
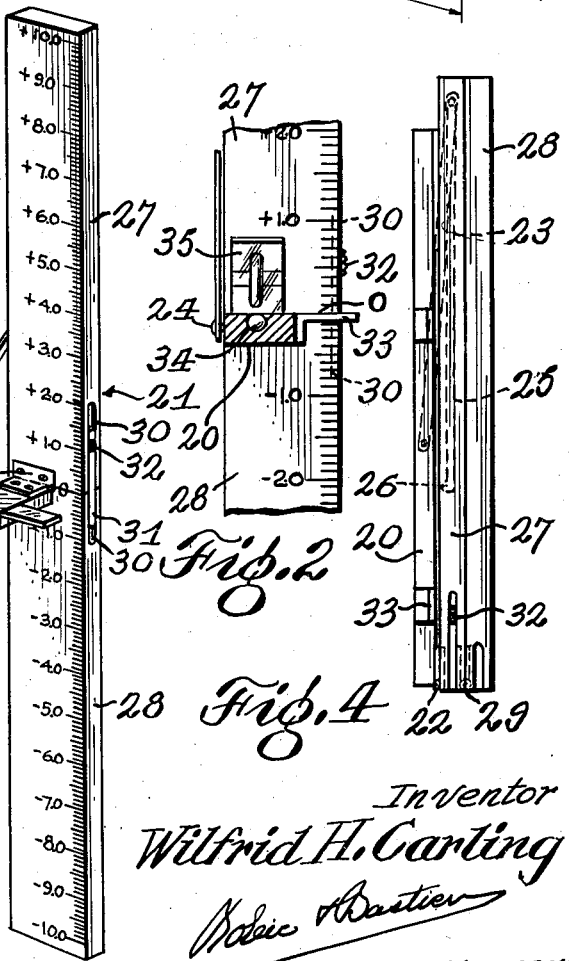
Fig. 2
Fig. 4
Inventor
Wilfrid H. Carling
By  Attorneys Patented June 28, 1949

2,474,466

UNITED STATES PATENT OFFICE 2,474,466

MEASURING INSTRUMENT

Wilfrid Henry Carling, Westmount, Quebec, Canada

Application December 31, 1947, Serial No. 795,017

1 Claim. (Cl. 33—64)

The present invention relates to a measuring instrument adapted especially for use in measuring heights and ranges.

The main object of the invention is to provide such an instrument which is extremely simple in design, and may be used effectively by any one having natural intelligence or a secondary school education.

Another important object is to provide an instrument of the character described which is of light portable construction, being foldable to carry around in a pocket.

Still another object resides in the provision of an instrument of the type set forth which is sufficiently accurate for all normal purposes in the estimation of heights, ranges, etc.

Yet another object is to provide a device as set forth above which may be held in the hands for sighting purposes, with which readings may be quickly taken for purposes of estimation and of such a nature that no involved computations need be undertaken to translate direct readings to final results.

And another object resides in the provision of a measuring instrument of the character described, the scales of which, from which readings are taken, are corrected for the error inherent in sighting owing to the curvature and disposition of the eye.

Other objects and advantages will become apparent, or be further pointed out, in the description to follow.

As an example, and for purposes of illustration only, a preferred embodiment of my invention is shown in the annexed drawing, wherein:

Fig. 1 shows a perspective view of the instrument in set-up position ready to be sighted;

Fig. 2 shows a detail elevation of a portion of the instrument of Fig. 1 looking along the sighting arm;

Fig. 3 shows a detail section through the means connecting the various members of the instrument;

Fig. 4 shows a side elevation view of the device in folded position ready for carrying, and Fig. 5 shows a partly-diagrammatic elevation view of one example of the use of the instrument.

Referring now to the drawing, wherein the same reference characters denote corresponding parts throughout, the instrument of my invention is seen in its simplest form to consist of a pair of perpendicularly-disposed members 20 and 21, the former of which will constitute a sighting arm and the latter a calibrated measuring arm. Figure 1 shows that the calibrated arm 21 is divided along one edge thereof, facing the sighting arm, into a pair of identical decimal scales increasing in value in each direction away from a medial transverse line O. With the member 21 disposed vertically, readings on the upper scale may be considered as positive in value, or above eye level, and those on the lower scale negative, or below eye level, and the sighting arm is connected to arm 20 so that, when arranged perpendicular thereto, the upper surface of the former is in alignment with the bisecting line O on the latter.

In order that the main members of the instrument may be collapsed when not in use, they are preferably connected pivotally adjacent the line O, as by hinge 22. And, in order that the sighting arm be releasably lockable in operative position relative to member 21, means such as stay 23 are provided for this purpose. Thus this stay may be pivoted at 24 to an edge of arm 20 intermediate the length thereof, the other end of the stay being slidably engageable in a suitably shaped groove 25 bordering the calibrated arm. A notch 26 at the lower extremity of this groove will ensure locking of the members in operative position.

Again, it may be considered preferable that the calibrated arm itself be bisected into pivotally connected sections 27 and 28. To this end, the sections might be separated at the line O as in Figs. 1, 3 and 4 and a hinge such as 29 preferably connect the sections at the rear face of the member, thus enabling the instrument to be collapsed, as shown in Fig. 3, into the folded position of Fig. 4. To hold the two sections 27 and 28 in rigid alignment when in operative position, a groove such as 30 is preferably formed in corresponding edges of each for a short distance from the adjacent ends thereof. A bolt 31, having a projecting button 32 for operating purposes, may be slidably disposed in one of these grooves and be adapted to protrude into the other for locking purposes.

In operation, the instrument will be first opened out into operative position and then held with the calibrated member upright and the sighting arm horizontal, the free end of the latter being rested against the cheek, say, so that the eye may be disposed as close as possible to this end of the arm to sight along the surface thereof. In practice, it has been found preferable to shape the sighting member somewhat narrower than the calibrated member, and to provide at least a pair of sighting arms such as 33 projecting out from one longitudinal edge of the former on the calibrated side of the instrument. These arms will be diposed intermediate the length of the sighting arm and will have their sighting surfaces level with the upper face thereof, in alignment with line O. Also, arms 33 will project sufficiently out from the instrument to permit sighting past the calibrated arm (see Fig. 2). Such an arrangement will avoid any blurring of the vision which might be caused by positioning the free end of the sighting arm directly in front of the eye.

To facilitate holding the sighting arm level, and to enable the instrument to take resonably accurate horizontal sights over short distances, a spirit level such as 34 might be provided on arm 20 near the sighting end thereof. In order that the position of the level bubble be visible when sighting, a mirror such as 35 is preferably secured pivotally to the sighting arm behind the bubble. Thus, by tilting the mirror upwardly somewhat, as in Figs. 1 and 2, it becomes possible to see the bubble and adjust the level of the sighting arm accordingly when making a horizontal sight.

The principle of the instrument is that, in sighting upon a target, the triangle formed between the eye of the observer and the upright target is similar to that portion thereof which is intercepted by the vertical calibrated member 21. Thus, if the total length of the sighting arm be made to bear some well defined ratio to the length of each of the decimal scales, then either the height or the range of the target (if the other quantity is known) may be found by simply reading the points at which the lines of sight to the top and bottom of the target intercept the scales on the calibrated arm. The problem is even further simplified when it is desired to measure the height, say, of an object of any given range which stands on the same level as the observer. Thus, for example, it may be assumed that, in Fig. 1, the length of arm 20 is substantially equal to the length of each of the scales calibrated decimally upwards and downwards from line O. If, then, the instrument is sighted horizontally on an object at distance D and of height H, and the top of the object is seen to reach to 3.5 on the positive scale of member 21, the following conditions hold true:

$$\frac{H}{D}=\frac{3.5}{10}$$

or $$H=\frac{3.5\,D}{10}$$

The distance D being known, obviously the height of the object may easily be computed. Thus, if D be 100 feet, H is equal to 35 feet.

In actual fact, it has been found that, since the observer must shift his eye (rolling the eyeball upward or downward) between taking the horizontal sight and then the reading on the top or bottom of the target, the actual ratio between the length of arm 20 and the divisions on the scales must be adjusted to compensate for the error thus introduced. If the length of arm 20 is exactly 10 units (inches, say), it would be expected that each scale would also consist of 10 units (identical or in exact proportion to the former), decimally divided. This is not the case, however, where it is desired to correct the error noted above, since the latter becomes cumulative in nature as the eye travels away from the zero line. Thus it has been experimentally determined that each of the decimal scales will be approximately 1.065 times the length of the sighting arm in order that sighting error be overcome.

Figure 5 shows an example of the use of the instrument. The object is to obtain the height of tree 40, the distance of which, 41, along the ground from the observer, is either known or may be measured with a tape. The observer stands at 42, holds the sighting arm of the instrument to his eye 43 at a height 44 above the ground, and, using the level bubble, sights along horizontal line 45 at the target. When a suitably distinctive sighting point 46 on the tree's outline has been picked up on line 45, the instrument is aligned on this point. Then, checking from time to time to ensure that the instrument has not moved, readings are taken of the points 47 and 48 where the lines 49 and 50, respectively, intersect the scales on member 21. Line 49 is that which the eye follows in looking at the top of tree 40, whilst line 50 is obtained by sighting at a point 51 on the tree at a distance equal to 44 above its base.

Since the ground slopes downwardly from the observer, point 47 will be presumed to give a reading X on the positive scale and point 48 a reading Y on the negative, or lower, scale. The height of the tree will then equal the sum of the portion above line 45, the portion between the latter and point 51, and distance 44. From the foregoing:

$$\text{Height of tree } 40=\frac{XD}{10}+\frac{YD}{10}+44$$

or $$H=\frac{(X+Y)D}{10}+44$$

D being the horizontal distance between observer and tree.

Obviously, from the above, it is only a simple operation to calculate H, for D is clearly a function of the ground distance and reading Y, and tables may be provided giving the percentage of slope distance 41 which D is for any scale reading Y.

It is clear, too, that if the height H were known and it was desired to find D, the same procedure might be followed in order to determine the unknown quantity. Thus, if a rod of any standard or known size is held at various points to be sighted upon with the instrument, the distance to these points may be determined from appropriate scale readings. And tables may be provided giving range for any scale reading for specific rod lengths.

Again, if neither the height nor range of a particular target are known, it will be apparent that both these quantities may be found if a pair of sights are taken from locations mutually aligned with the target and a specified, known distance from each other. The scale readings from these sights may be plotted on graph paper with the known distance as a base, and results obtained for the height of the target and its range from each sighting location. Alternatively, the same results might be obtained from the readings by mathematical computation.

In certain cases, and primarily where factors of weight and economy are of paramount importance, the instrument may be constructed with a calibrated member made of only a single section having only a single scale. That is, the lower section 28 of member 21 would be omitted. This, although less convenient, would not greatly limit the use of the instrument, since in the example of Fig. 5 it would only be necessary to sight twice, turning the instrument upside down between readings, to obtain the values of X and Y. Such a modification would, however, greatly decrease the cost of the device.

In any event, it will be understood that variations may be made in the means connecting the members, and that these latter may adopt widely varying shapes and be of any suitable material, with an eye to reducing the weight of the instrument and rendering the latter more compact and foldable. Clearly the method described for reducing errors inherent in sighting with the instrument greatly enhances the accuracy of the latter without resort to an expensive sighting device. And the simple sighting arm and calibrated scale enable reading to be taken quickly and effectively even by persons with little or no technical training.

It is also apparent that, owing to the relation in length between the scales and the sighting arm, the latter being usually and effectively (taking into account the aforementioned adjustment for eye-error) either equal to or an integral multiple of the former, the readings taken with the instrument may be quickly and easily computed into final results, with or without the aid of suitable tables which may be provided, by anyone having a knowledge of simple arithmetic. If greater accuracy is sometimes needed, the sighting arm may be provided with an extendible section which effectively doubles or triples its length.

Therefore I do not limit myself to the particular embodiment of my invention herein shown and described, since it is clear that various changes may be made in the size, shape and arrangement of parts without departing from the spirit of the invention or the scope of the subjoined claim.

Having thus described my invention, I claim:

A measuring instrument of the character described, comprising a member having a graduated scale thereon, a sighting arm secured in perpendicular relation to said member at one end of said scale, the length of said arm being in predetermined proportion to the graduations of said scale whereby, when the former is held horizontally, the ratio of height to range of any object sighted may be determined by noting the reading at which the vertical scale is intersected by the lines of sight to limiting points of said object, the said arm being narrower than the graduated member, and at least a pair of aligned projections level with the sighting surface of the arm and projecting outside said arm from intermediate the length of one edge, said projections being adapted for sighting purposes and extending beyond the width of said member.

WILFRID HENRY CARLING.

REFERENCES CITED

The following references are of record in the file of this patent:

UNITED STATES PATENTS

| Number | Name | Date |
|---|---|---|
| 499,950 | Baillie | June 20, 1893 |
| 1,437,203 | Seelye | Nov. 28, 1922 |
| 2,334,739 | Zak | Nov. 23, 1943 |

FOREIGN PATENTS

| Number | Country | Date |
|---|---|---|
| 59,459 | Norway | June 2, 1938 |